(12) United States Patent
Kim (10) Patent No.: US 8,272,655 B2
(45) Date of Patent: Sep. 25, 2012

(54) MINI BIKE HAVING PEDAL AS A POWER GENERATOR

(76) Inventor: Mi Nar Kim, Daejeon (KR)

( * ) Notice: Subject to any disclaimer, the term of this patent is extended or adjusted under 35 U.S.C. 154(b) by 279 days.

(21) Appl. No.: 12/677,938

(22) PCT Filed: Sep. 11, 2008

(86) PCT No.: PCT/KR2008/005383
§ 371 (c)(1),
(2), (4) Date: Mar. 12, 2010

(87) PCT Pub. No.: WO2009/035278
PCT Pub. Date: Mar. 19, 2009

(65) Prior Publication Data
US 2010/0225085 A1    Sep. 9, 2010

(30) Foreign Application Priority Data

Sep. 12, 2007  (KR) .................. 10-2007-0092744

(51) Int. Cl.
  *B62M 1/00*    (2010.01)
(52) U.S. Cl. ........ 280/221; 280/220; 280/238; 280/252; 280/260; 280/253; 280/259; 280/256; 280/257; 74/322; 74/112; 74/372
(58) Field of Classification Search .................. 280/221, 280/220, 238, 252, 260, 253, 259, 256, 257; 74/322, 112, 372
See application file for complete search history.

(56) References Cited

U.S. PATENT DOCUMENTS 2,707,112 A * 4/1955 Ludwigson et al. .......... 280/221
(Continued)

FOREIGN PATENT DOCUMENTS
KR    10-2003-0000148 A    1/2003
(Continued)

OTHER PUBLICATIONS

International Search Report of International Application No. PCT/KR2008/005383.

*Primary Examiner* — Tashiana Adams
*Assistant Examiner* — Marlon Arce
(74) *Attorney, Agent, or Firm* — Kile Park Goekjian Reed & McManus PLLC (57) ABSTRACT

A mini bike for strengthening a leg muscle, and for enjoying amusement and a leisure time is provided. The mini bike having a pedal as a power generator includes: a driver having a first bevel gear in order to transmit rotation power generated by a rolling motion of a pedal; a second bevel gear installed to transmit rotation power generated in the driver; a first power transmission gear coaxially installed in the second bevel gear to transmit rotation power to a spline shaft; a clutch positioned at the spline shaft to selectively connect rotation power of the first power transmission gear to a first gearshift and a second gearshift and for controlling a low speed and a high speed; a first driving gear and a second driving gear for rotating by selection of the clutch; and a driving controller including a gearshift in which the clutch is connected to the cable in order to select the first gearshift and the second gearshift. Therefore, when young boys and girls go to or coming from a school, when office workers go to or come from their office, when an adult enjoys a leisure time, as well as when children enjoy amusement, the bike can be used, and when riding on the bike, the user can enjoy a low speed or a high speed, and the bike can be used for strengthening a leg muscle.

3 Claims, 9 Drawing Sheets

U.S. PATENT DOCUMENTS

| | | | |
|---|---|---|---|
| 4,186,934 A | 2/1980 | Collings | |
| 4,828,284 A | 5/1989 | Sandgren | |
| 5,294,140 A | 3/1994 | Rinkewich | |
| 5,542,310 A * | 8/1996 | Lee | 74/372 |
| 6,402,173 B1 | 6/2002 | Chiu | |
| 6,764,088 B2 * | 7/2004 | Hung | 280/221 |
| 7,487,987 B2 * | 2/2009 | Yan | 280/221 |
| 2009/0066053 A1 * | 3/2009 | Yan | 280/252 |

FOREIGN PATENT DOCUMENTS

| | | |
|---|---|---|
| KR | 10-2003-0060448 A | 7/2003 |
| KR | 1020060005172 A | 1/2006 |
| KR | 20-0418734 Y1 | 6/2006 |
| KR | 1020060060383 A | 6/2006 |
| KR | 20-0430474 Y1 | 11/2006 |
| KR | 1020090035070 A | 4/2009 |

* cited by examiner

MINI BIKE HAVING PEDAL AS A POWER GENERATOR

TECHNICAL FIELD

The present invention relates to a mini bike of a quick board form used for strengthening a leg muscle and for amusement, and more particularly, to a mini bike including a driver having a handle and a plurality of wheels and to be driven by a pedal and a driving controller for transmitting rotation power generated by the driver to the wheels in a low speed or a high speed such that when young boys and girls go to or coming from a school, when office workers go to or come from their offices, when an adult enjoys a leisure time, as well as when children enjoy amusement, the bike can be used, and when riding on the bike, the user can enjoy a low speed or a high speed and can easily ride on the bike even in a hilly area, and the bike can be used for strengthening a leg muscle.

Nowadays, people enjoying a mini bike of a motorcycle form increase, however there is a defect that the mini bike of a motorcycle form can be driven by only a person who can drive a motorcycle. In order to overcome a defect that the mini bike of a motorcycle form is driven by only a person who can drive a motorcycle, by providing a mini bike of a quick board form to be operated by stamping a pedal such that people of all ages and both sexes may enjoy, the user can enjoy the speed of the mini bike and a pleasure of riding on the bike while performing a muscular exercise of legs.

BACKGROUND ART

Conventionally, a quick board for amusement of children has existed, however a conventional quick board has a pedal and a handle, and wheels are installed at the front side of the pedal and at both sides of the rear side thereof. When using the quick board, the user can ride on the quick board by putting one foot on a pedal and pushing the ground with another foot. Such a driving method is inconvenient because the user should continue to push the ground with the foot. Particularly, because the quick board has a small width, length and a small wheel, there is a problem that much time is required for children to skillfully ride on the quick board and a safety accident may occur in a process of learning to ride on the quick board.

Figure 1:
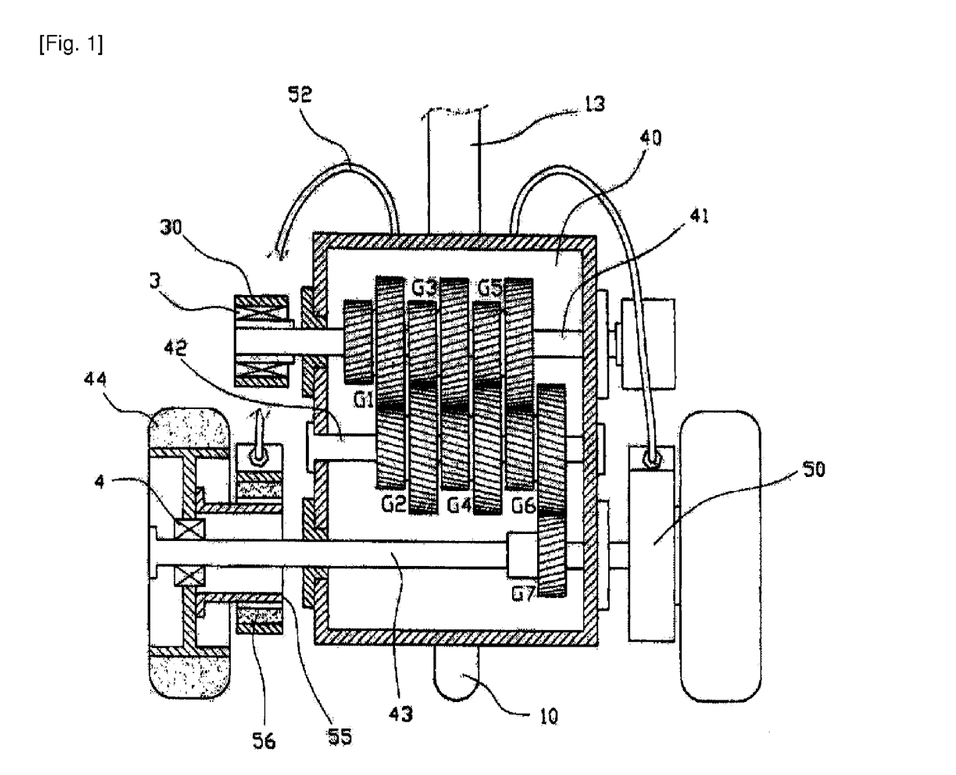
FIG. 1 is a plan view of a conventional mini bike in which a driving gear is formed with a plurality of spur gears.

Further, as a conventional quick board and bike, Registered Korean Patent No. 0625647 discloses a nonmotor bike including a vertical shaft in which a handle and a front wheel are provided at an upper end and a lower end thereof, respectively and whose height can be adjusted, a main frame connected to be folded to the vertical shaft through a hinge, a driving frame in which a pedal is formed in a speed-up body formed at the rear end of the main frame, and a rear wheel for rotating by driving the pedal, wherein, in the driving frame, a latchet gear is installed at both ends of an upper shaft of the speed-up body, the rear wheel is combined with the upper shaft using a gear, a free wheel clutch is installed at both ends of a lower shaft that can be speed up with a gear ratio, the center thereof is fastened to the main frame through the hinge, both ends thereof further have a seesaw frame connected to the each driving frame, and each end of the seesaw frame can be connected to and supported by each driving frame through a joint that can be bent to the upper, the lower, the left, and the right (see FIG. 1).

The Registered Korean Patent No. 0625647 has a configuration having connection by only a plurality of spur gears. When the user drives the gear by pressing the pedal 31, after the driving is started, a force for pressing the pedal is easily obtained, however, because the user cannot intentionally adjust a speed, a brake should be used in order to reduce a driving speed of the wheel after accelerating a speed and thus a pad of the brake is easily worn, and when traveling up on the hill with the bike, a traveling speed does not increase.

Further, in Registered Korean Patent No. 0625647, because gears G1 to G7 driven by the pedal are formed in the same method, and initial power for driving when the user firstly steps a pedal is heavily started, instead of being softly started.

Figure 2:
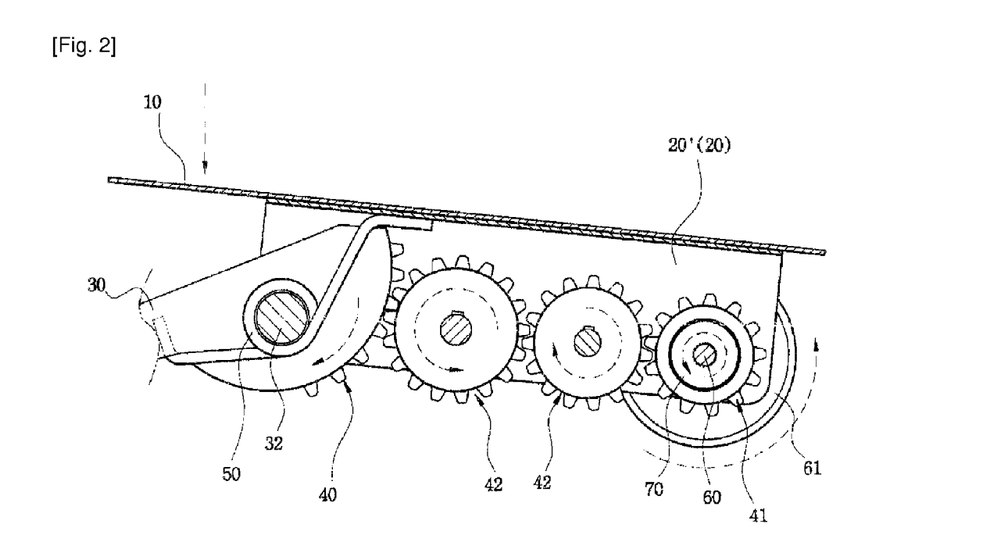
FIG. 2 is a side view of a quick board of a conventional mini bike form in which driving gears are formed with a one line interlocking method.

Further, Registered Korean Patent No. 0553134 discloses a quick board having a self power generator including two support brackets 20 and 20' provided in a lower part of a board 10 and provided apart a predetermined distance from each other; a lever 30 rotatably installed at the front side of the support brackets 20 and 20' and in which a front wheel 31 is rotatably installed at a front end thereof; a driving means 40 installed in a rotation shaft 32 of the lever 30 to transmit power by rotating together with the rotation shaft 32; a torsion spring 50 installed around the rotation shaft 32 of the lever 30 to apply clockwise rotation power to the lever 30; a rotation shaft 60 rotatably installed at the rear side of the support brackets 20 and 20' and installed to rotate both rear wheels 61 at both ends thereof; a driven means 41 installed between both support brackets 20 and 20' of the rotation shaft 60 to receive power; an overrunning clutch 70 installed between the driven means 41 and the rotation shaft 60 to transmit one direction rotation power of the driven means 41 to the rotation shaft 60 and not to transmit rotation power of the rotation shaft 60 to the driven means 41; and a power transmission means 42 installed between the driving means 40 installed in the rotation shaft 32 of the lever 30 and the driven means 41 installed in the rotation shaft 60 of the rear wheel 61 (see FIG. 2).

The driving means and the driven means are installed to engage in a bottom support bracket of the board, and if the user presses and releases a rear part of the board with one foot on the board, the driving means drives the driven means while operating like a seesaw about a shaft and thus the wheel is driven.

In Registered Korean Patent No. 0553134 having the above-described configuration, because a user should move a handle while operating the board like a seesaw, a balance of a waist, legs, and arms does not coordinate and thus the user may hurt their waist. In a general board having no handle, the user rides on the board using a balance of a waist without gripping the handle, however in the registered Korean Patent No. 0553134, by operating the board like a seesaw, the handle should be steered while the center of both feet moves to an upper part and a lower part of a front surface and a rear surface along the board, thus a human body loses a balance and a speed of the quick board is limited by a seesaw operation of the board, and thus the user cannot enjoy the speed.

Figure 3:
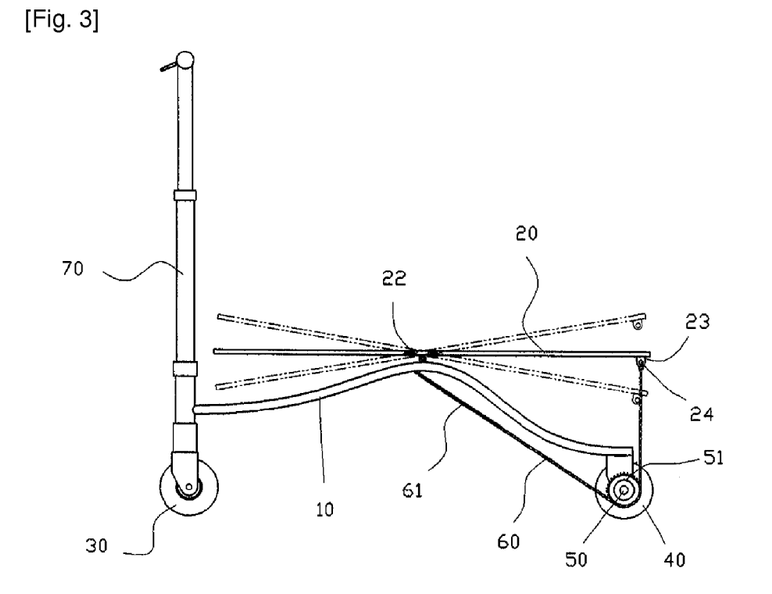
FIG. 3 is a side view of a conventional quick board, which is a nonmotor mini bike in which a driver is formed with a chain.

Further, Registered Korean Utility Model No. 0430474 discloses a quick board whose front wheel 30 and rear wheel 40 are coupled to the front side and the rear side, respectively of a frame 10 having a protruded part whose the center is curved to an upper part, and that has a handle shaft 70 for adjusting a direction of the front wheel 30, when a pedal 20 is coupled to perform a seesaw motion about the center in the protruded part, wherein a sprocket 51 is installed at the center of a rotation shaft 50 for connecting the rear wheels 40 and that is coupled to the rear side of the frame 10, and one side of a chain 60 coupled to the sprocket 51 is fixed to a lower part of the rear side of the pedal 20, and the other side of the chain 60 is fixed to a protruded part of the frame 10 through a spring 60 (see FIG. 3).

In Registered Korean Utility Model No. 0430474, by bending an intermediate portion of the frame of the quick board toward an upper part, a central part of a pedal bottom installed in the upper part is coupled to a bent portion of the frame, one side end of the chain is fixed to the center bottom of the frame, the other side end is connected to a chain gear of a rear wheel shaft to be connected to the bottom of the rear end of the pedal, and when the user drives the pedal like a seesaw, the chain drives the chain gear of the sprocket and thus the wheel is driven. In such a configuration, according to the user's weight, the difference occurs in a transmission force for driving the chain, and when the user drives the pedal with two feet like the seesaw, the user should ride on the quick board consisting of only two wheels while steering a handle, and thus because two wheels do not smoothly drive according to a user, children's safety accident may occur.

Figure 4:
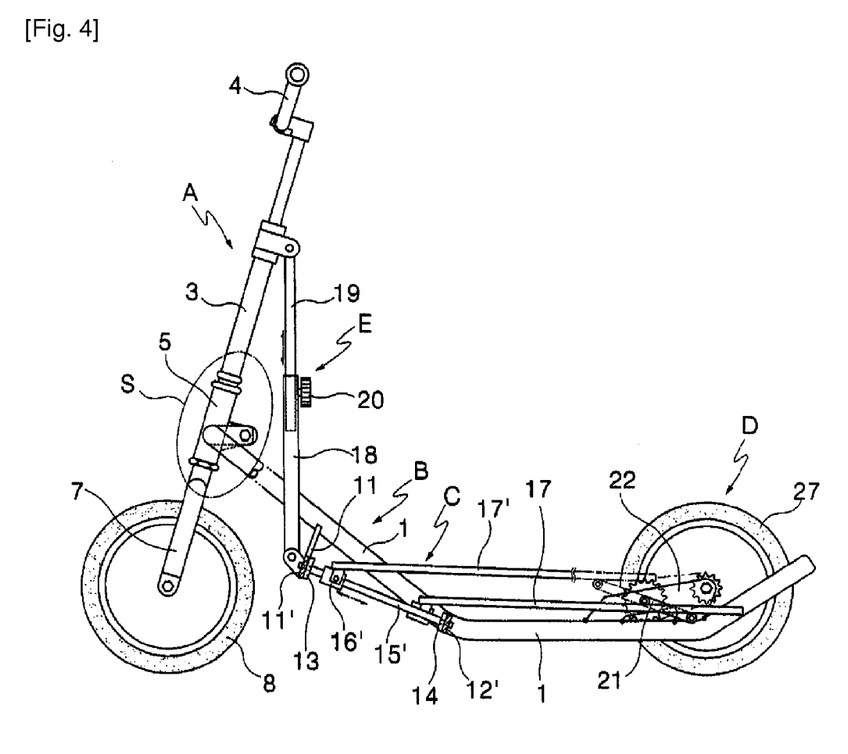
FIG. 4 is a side view of a conventional mini bike in which wheels can be driven by alternate sliding of pedals.
Figure 5:
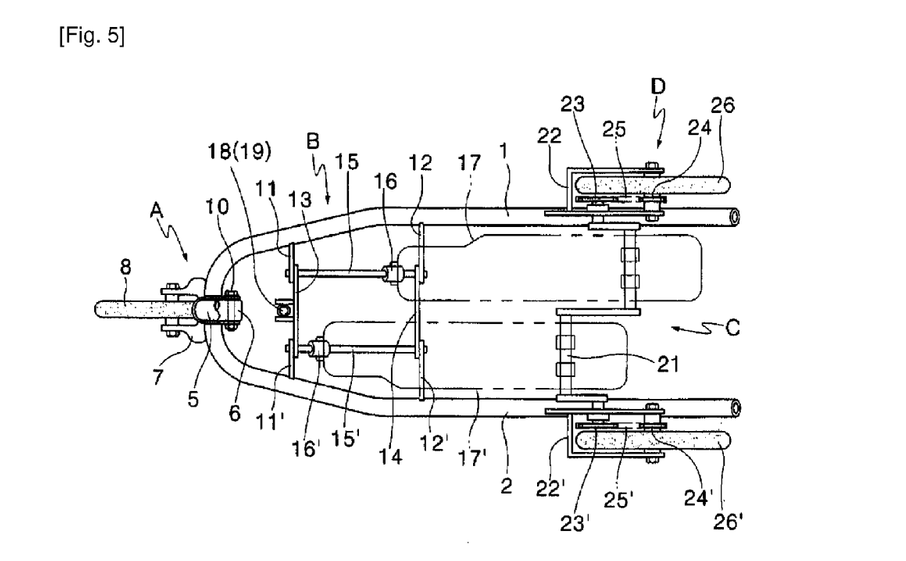
FIG. 5 is a plan view of a conventional mini bike in which wheels can be driven by alternate sliding of pedals.

Further, Registered Korean Utility Model No. 041873 discloses a walking exercise device including a steering unit A, a frame B, an operation unit C, a driver D, and a folding unit E, wherein a bearing pipe 5 between a handle shaft 3 and a hook 7 of the steering unit A is coupled to move with a left frame 1 and a right frame 2 of the frame B, sliders 16 and 16' are fitted into pedal rails 15 and 15' pedals 17 and 17' are provided between cranks 21 for forming a shaft of driving sprockets 23 and 23' and the folding unit E whose length can be adjusted is provided between a front connector 13 of the frame B and the handle shaft 3 of the steering unit A (see FIGS. 4 and 5).

If alternately pushing pedals in order to drive a wheel, the pedals are alternately slid along the pedal rail, when the pedal and the crank rotate at the rear side, the wheel drives. While the pedals are alternately slid on a horizontal line, the crank coupled to the rear side rotates and thus a linear motion is converted to a rotation motion by only a user's feet. In order to prevent the user's feet from slipping from the pedal, an unnecessary force for closely contacting a leg should be applied, and a rotation radius of the crank is proportional to a distance in which the pedal moves on a horizontal line, and thus a speed for driving the wheel cannot be increased.

DISCLOSURE OF INVENTION

Technical Problem

The present invention has been made in view of the above problems, and provides a mini bike having a pedal as a power generator including a driver having a handle and a plurality of wheels and driving by a pedal and a driving controller for transmitting rotation power generated by the driver to the wheels in a low speed or a high speed such that, when young boys and girls go to or coming from a school, when office workers go to or come from an office, when an adult enjoys a leisure time, as well as when children enjoys amusement, the bike can be used, and when riding on the bike, the user can enjoy a low speed or a high speed, the bike can be easily used even in a hilly area, and the bike can be used for strengthening a leg muscle by stamping a pedal.

Technical Solution

In accordance with an aspect of the present invention, a mini bike of a quick board form having a pedal as a power generator in which a rear wheel and a front wheel are connected to a bike body and the front wheel is steered by a handle, includes: a driver in which a first bevel gear is driven by a pedal and whose rotation power is transmitted to a shaft; and a driving controller for transmitting a drive force generated in the driver to a second bevel gear, a first power transmission gear, a first gearshift, a second gearshift, first, second, third connection gears, and first and second driving gears to drive the rear wheel, wherein a clutch is installed between the first gearshift and the second gearshift of the driving controller and thus, when driving the mini bike, a speed of the mini bike can be selected to a high speed and a low speed, such that, when young boys and girls go to or coming from a school, when office workers go to or come from their office, when an adult enjoy a leisure time, as well as when children enjoys amusement, the bike can be used, and the bike can be easily traveled even in a hilly area, and the bike can be used for strengthening a leg muscle by stamping by a pedal.

Advantageous Effects

According to the present invention, as a user rides on a mini bike by stamping a pedal, the mini bike can be driven with a speed appropriate for a taste and a body condition of the user, because it is manufactured in a small size, the mini bike can be enjoyed by simply carrying almost regardless of time and place, for example, when using public transportation such as a subway or a bus, when commuting from public transportation to a home or a company, when going to or coming from a school, when utilizing a lunch time, when enjoying a leisure time, when performing a muscular exercise of legs, and when exercising at a surrounding park after leaving an office or at a weekend.

DESCRIPTION OF REFERENCE NUMERALS INDICATING ELEMENTS IN THE DRAWINGS

1: front wheel
2: rear wheel

3: handle
4: handle shaft
5: bracket
6: hinge
7: brake handle
8: brake
9: bike body
10: bike
11, 11': pedal
12: pedal shaft
13: shaft
14: first bevel gear
15: driver casing
21: driver shaft
22: second bevel gear
23: spline shaft
24: second power transmission gear
25: first power transmission gear
26: first gearshift
27: second gearshift
28: clutch
29: first connection gear
30: first driving gear
31: second connection gear
31': third connection gear
32: second driving gear
33: cable
33': spring
34: gearshift
35, 35': clutch cam
36: clutch handle
37: driving controller casing
38: reinforcement member
A: driver
B: driving controller

BEST MODE FOR CARRYING OUT THE INVENTION

An exemplary embodiment according to the present invention is described hereinafter in detail.

A mini bike having a pedal as a power generator that has a handle 3 in an upper part in order to steer a front wheel 1, and that connects a front wheel 1 side and a rear wheel 2 to a bike body 9, and that drives the wheels by operating a pedal connected to a plurality of gears, and that adjusts a speed thereof using a brake handle 7 installed in the handle 3 includes: a driver A that connects a pedal shaft between both pedals 11 and 11' and in which a spring 16 is installed at the inside of a connector of both sides of the pedal shaft 12 to which the both pedals 11 and 11' are connected, and in which one end of the shaft 13 and the pedal shaft 12 are connected to a first bevel gear 14 in order to transmit rotation power generated by a vertical rolling motion due to an elastic force of the spring 16; a second bevel gear 22 installed to connect the other side end of the shaft 13 and a driver shaft 21 in order to transmit rotation power generated in the driver A; a first power transmission gear 25 coaxially installed in the second bevel gear 22 to be engaged with a second transmission gear 24 in order to transmit rotation power to a spline shaft 23; a clutch 28 positioned at the spline shaft 23 to selectively connect rotation power of the first power transmission gear 25 to a first gearshift 26 and a second gearshift 27 and that controls a low speed and a high speed; a first connection gear 29 and a first driving gear 30 engaged with the first gearshift 26 rotating by selection of the clutch 28 to rotate the rear wheel in a low speed; a second connection gear 31 and a second driving gear 32 engaged with the second gearshift 27 by selection of the clutch to rotate the rear wheel in a high speed; and a driving controller B including a gearshift 34 connected to the cable 33 in order to select the first gearshift 26 and the second gearshift 27 by laterally moving the clutch on the spline shaft 23.

The first gearshift 26 and the second gearshift 27 have clutch cams 35 and 35' respectively on surfaces corresponding to each other to transmit a rotation of the spline shaft.

One side end of the cable 33 connected to the gearshift 34 is connected to the clutch handle 36 installed at the handle 3 side.

A driver casing 15 and a driving controller casing 37 are installed in the driver A and the driving controller B, and a reinforcement member 38 is installed at a corner of each casing.

In the present invention having the above-described configuration, when a user rides on the bike 10, both feet of the user are put on each pedal.

In this case, the pedals 11 and 11' are positioned at the same height by the spring 16 installed to wind at both ends of the pedal shaft 12, and if only one side of the pedals 11 and 11' is stamped, the pedals 11 and 11' are alternately stamped, or the pedals 11 and 11' are simultaneously stamped, the first bevel gear 14 of the driver rotates while the pedal shaft 12 for connecting the pedal 11 and the pedal 11' rotates, thus the second bevel gear 22 rotates, thus each gear transmits rotation power to the rear wheel shaft, thus the rear wheel 2 drives, and thus the bike drives.

The bike according to an exemplary embodiment of the present invention enables to enjoy riding on the bike while a user exercises by manually driving a power bike of a mini motorcycle form.

Hereinafter, the present invention is described in detail with reference to the drawings.

Figure 6:
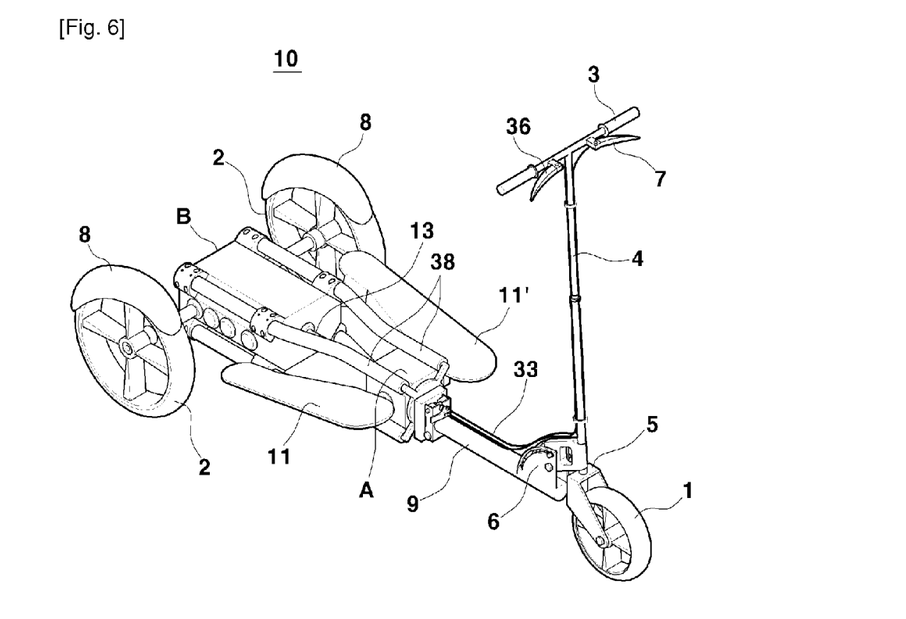
FIG. 6 is a perspective view of a mini bike according to an exemplary embodiment of the present invention.

FIG. 6 is a perspective view illustrating a mini bike according to an exemplary embodiment of the present invention. The mini bike includes one front wheel 1 and two rear wheels 2, and in the front wheel 1, a bracket is installed in a front wheel shaft, as in a normal quick board, and a handle shaft 4 that can be extended to two stages is provided in a central part of the bracket, and a handle 3 is provided at an upper end of the handle shaft 4.

Because a hinge 6 is formed at a lower end of the handle shaft 4 and a connector of a bike body 9, the bike 10 can be folded.

One end of the bike body 9 is connected to the casing 15 of the driver A, and a first bevel gear 14 for connecting one side end of the shaft 13 and the pedal shaft 12 for connecting the pedal 11 and the pedal 11' is installed within the casing 15. The first bevel gear 14 transmits the rotation power generated by a rolling motion of the pedals 11 and 11' to the shaft 13.

The other end of the shaft 13 is connected to a driving controller B side, and the driving controller B drives the rear wheel 2.

A plurality of gears including the second bevel gear 22 and a clutch 28 are installed within the driving controller B to drive the rear wheel 2 in a low speed or a high speed.

Constituent parts of the driving controller B are installed within the casing 37, and the casing 37 and the driver casing 15 of the driving controller are fixed to a lower frame, and a reinforcement member 38 is installed at a corner thereof to perform a function of a bike body, and even if an adult of a heavy weight rides on the mini bike, the mini bike is not deformed.

Further, a high performance disk type brake 8 for an electric power scooter different from a normal quick board brake is installed in the rear wheel 2 and is connected to a brake handle 7 installed at one side of the handle 3 using a cable to brake the driving of the rear wheel. A locking button is installed in the brake handle 7 such that the user may safely park the bike 10.

A clutch handle 36 is installed at one side of the handle 3 to convert the clutch 28 of the driving controller B in a high speed or a low speed.

Figure 7:
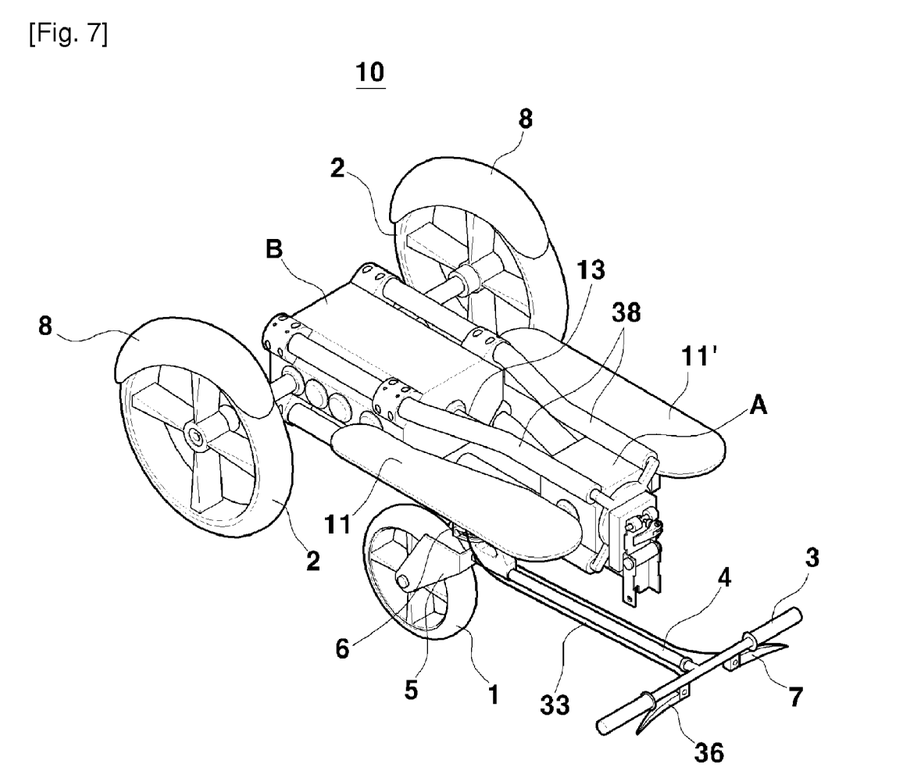
FIG. 7 is a perspective view illustrating a folded state of the mini bike according to an exemplary embodiment of the present invention.
Figure 8:
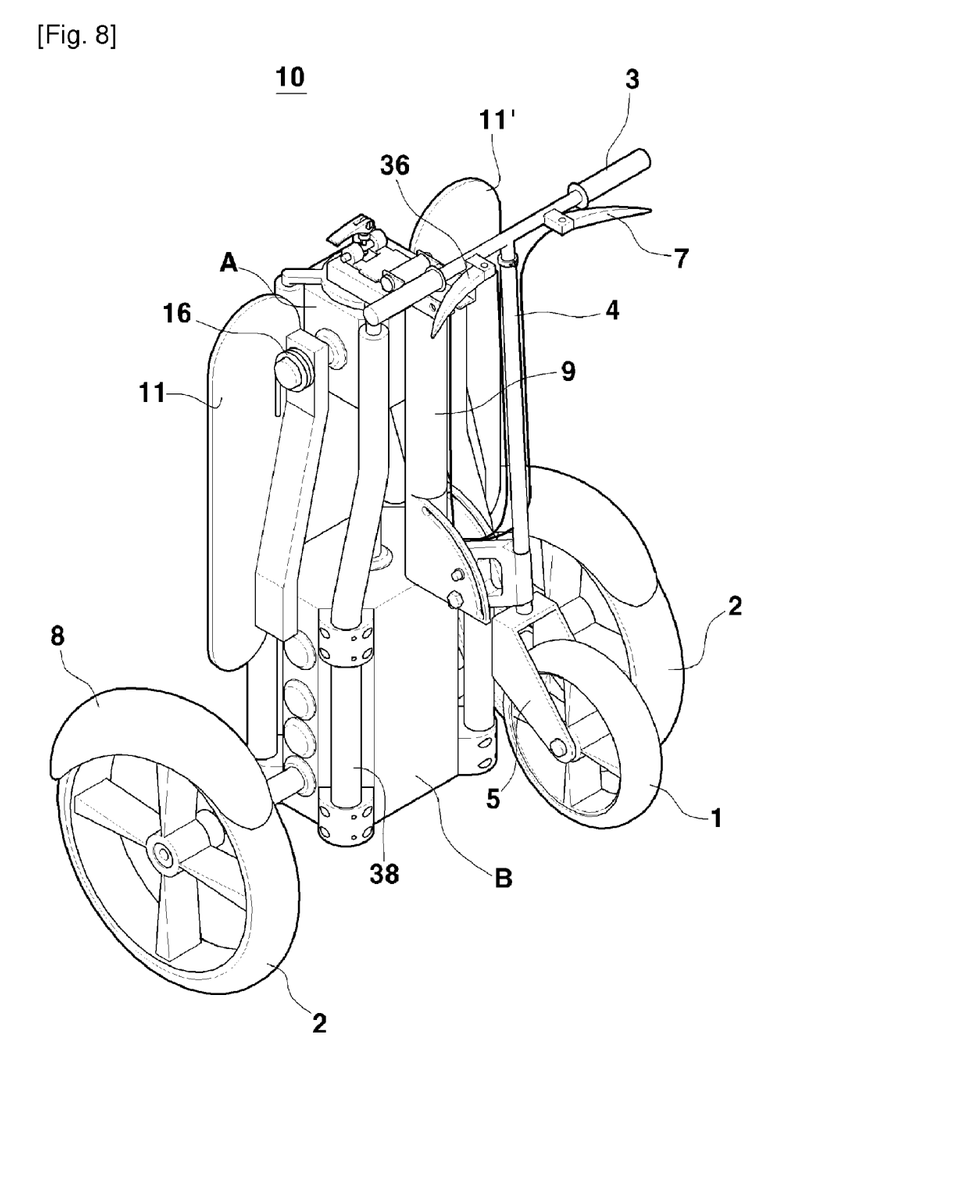
FIG. 8 is a rear perspective view illustrating a folded state of the mini bike according to an exemplary embodiment of the present invention.

FIG. 7 is a perspective view illustrating a folded state of a mini bike according to an exemplary embodiment of the present invention, and FIG. 8 is a rear perspective view illustrating a folded state of a mini bike according to an exemplary embodiment of the present invention.

By folding the handle shaft 4 of the bike using the hinge 6 connected to a front wheel bracket and a bike body in order to store the bike after the user uses the bike, a bulk of the bike can be reduced.

FIGS. 7 and 8 show a bike of the same form, FIG. 7 shows a plan configuration, and FIG. 8 shows a rear configuration.

Figure 9:
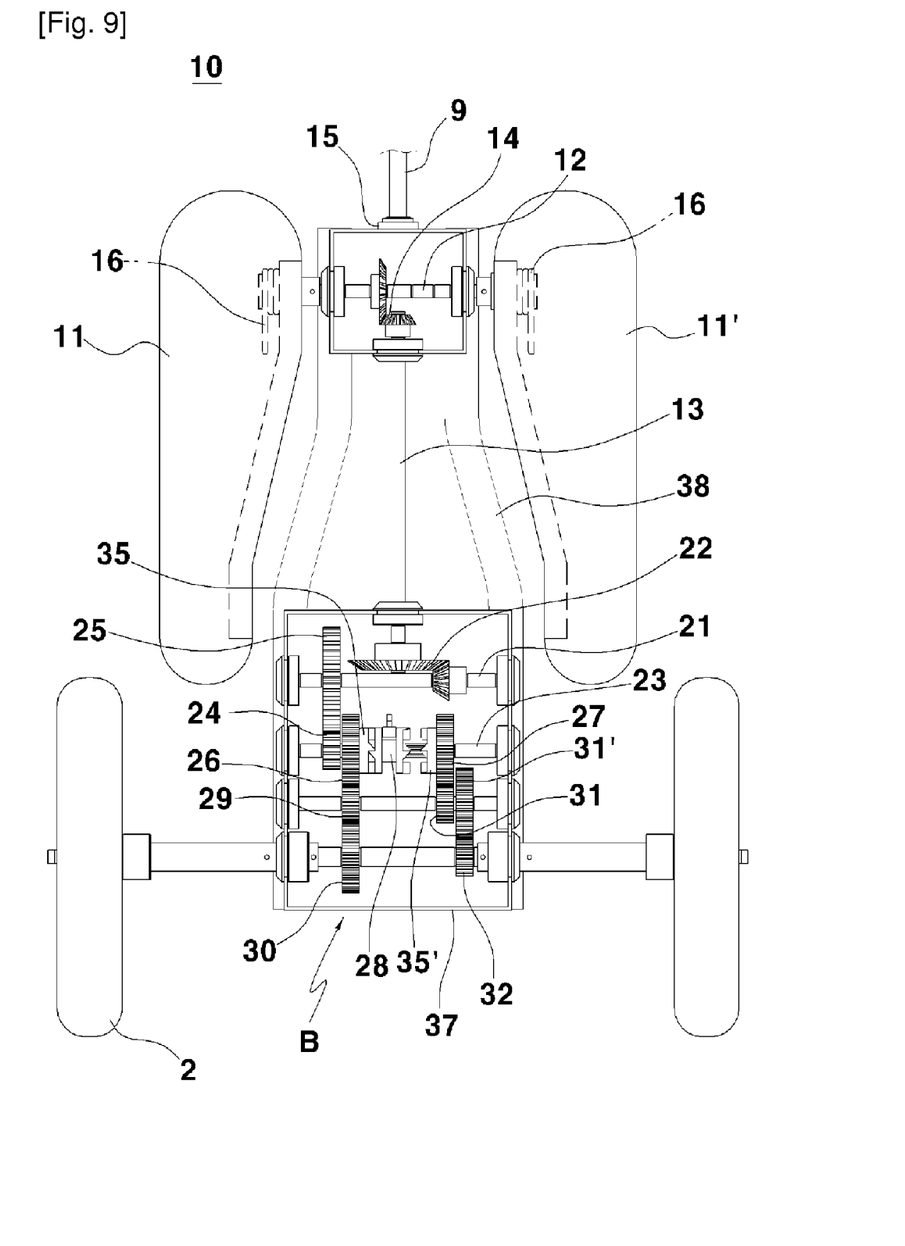
FIG. 9 is a plan view of a driver and a driving controller of the mini bike according to an exemplary embodiment of the present invention.

FIG. 9 is a plan view illustrating a driver and a driving controller of a mini bike according to an exemplary embodiment of the present invention.

In the driving controller B of the bike according to an exemplary embodiment of the present invention, the second bevel gear 22, having received rotation power from the first bevel gear 14 is installed in the driver shaft 21, and a first power transmission gear 25 installed at one side of the driver shaft 21 transmits rotation power of the second bevel gear 22 to a second power transmission gear 24 installed at the spline shaft 23.

A clutch 28 is positioned at a central part of the spline shaft, and a first gearshift 26 and a second gearshift 27 are installed at the left side and the right side, respectively of the clutch, and clutch cams 35 and 35' are installed in the corresponding surfaces of the first gearshift 26 and the second gearshift 27, respectively.

Therefore, the spline shaft 23 is rotated by the second power transmission gear 24, and in the first gearshift 26 and the second gearshift 27, because bearings are inserted to the spline shaft 23, even if the spline shaft 23 rotates, the first gearshift and the second gearshift do not rotate, and only the clutch 28 rotates along the spline shaft. The clutch installed at the center of the spline shaft can laterally move and rotates along a shaft in a rotation direction.

When the clutch is connected to the clutch cams 35 and 35' installed in one surface of the first gearshift or the second gearshift, a transmission of a connected side rotates, thus the first connection gear 29 or the second connection gear 31 engaged with one side thereof rotates, thus a third connection gear 31' installed on a coaxial line rotates the second driving gear 32 installed in a rear wheel shaft, or the first connection gear 29 rotates the first driving gear 30, thus the rear wheel 2 rotates, and thus the user can ride on the bike 10.

Figure 10:
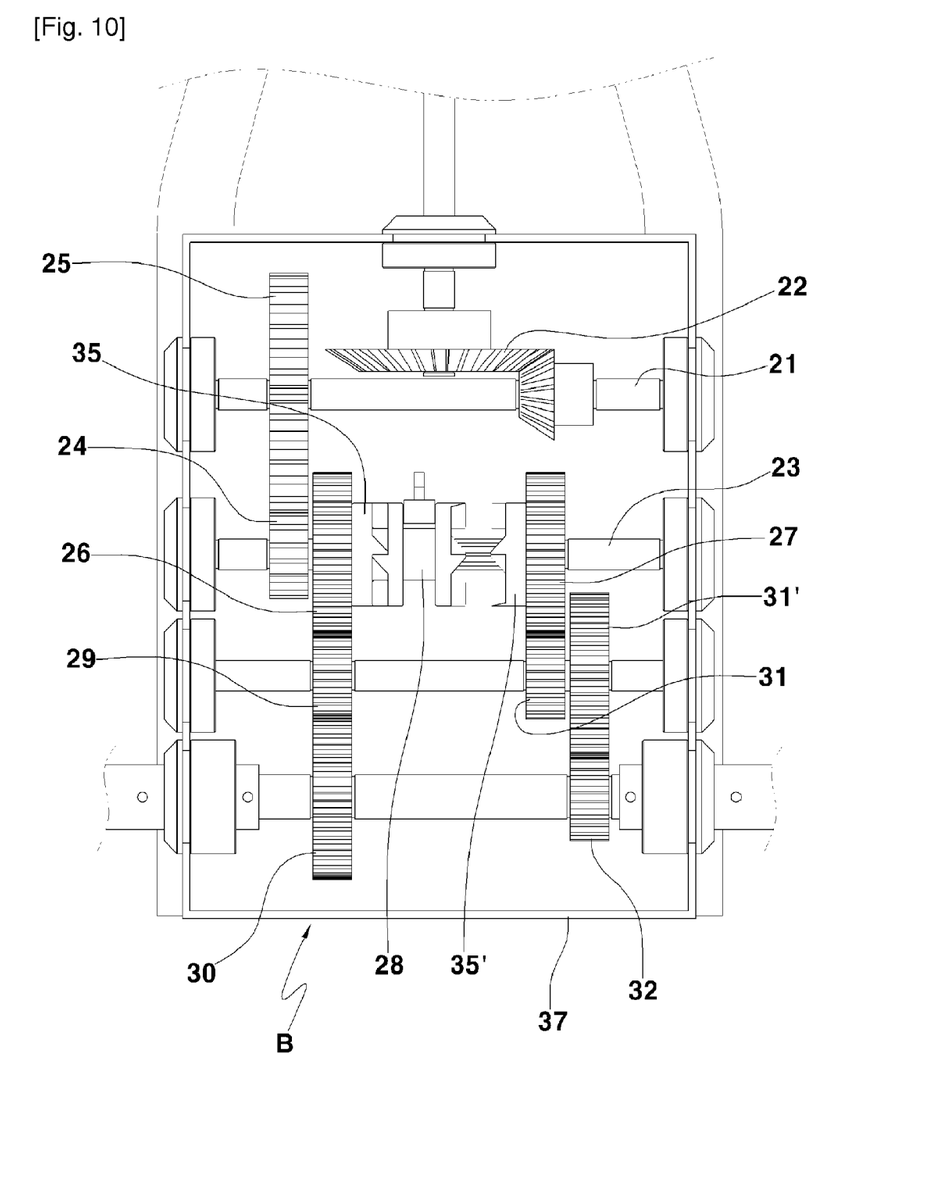
FIG. 10 is a view illustrating a state in which a clutch of the mini bike according to an exemplary embodiment of the present invention is connected to a low speed gear shift.

FIG. 10 is a partially enlarged view of a driving controller of a mini bike according to an exemplary embodiment of the present invention and illustrates a state where the clutch is connected to a first gearshift to operate in a low speed.

In order to operate the bike in a low speed, in a state of gripping the clutch handle 7 of the handle side, the bike is driven. In this case, the clutch is connected to the clutch cam 35 of the first gearshift 26, the first gearshift is engaged with the first connection gear 29, and the first connection gear 29 is connected to the first driving gear 30 installed in the rear wheel shaft to drive the rear wheel 2.

In this case, because the first connection gear 29 connected to the first gearshift 26 has a diameter smaller by a half than that of the first driving gear 30, the rear wheel rotates in a low speed, the second driving gear 32 and the second connection gear 31 engaged with the second gearshift 27 do not rotate, and only a shaft rotates.

Figure 11:
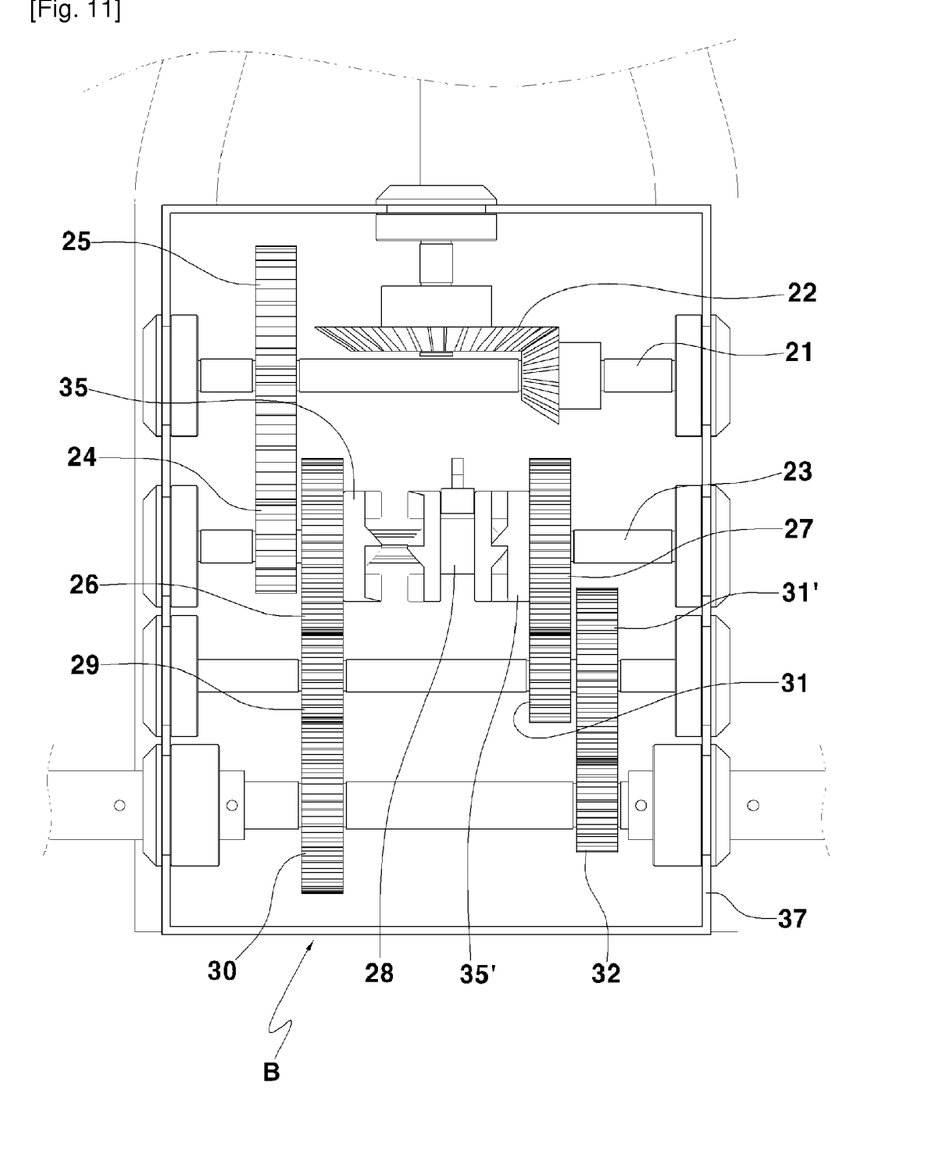
FIG. 11 is a view illustrating a state in which a clutch of the mini bike according to an exemplary embodiment of the present invention is connected to a high speed gear shift.

FIG. 11 is a partially enlarged view of a driving controller of a mini bike according to an exemplary embodiment of the present invention and illustrates a state where the clutch is connected to the second gearshift to operate in a high speed.

In order to operate the bike in a high speed, if the user releases the clutch handle 36, the clutch is connected to the clutch cam 35' of the second gearshift 27 by a spring interposed at one side of the clutch and rotates the engaged second connection gear 31 while rotating according to a rotation speed of the spline shaft, and while a third connection gear 31' installed on a coaxial line with the engaged second connection gear rotates, the third connection gear 31' rotates the second driving gear 32 and thus the rear wheel shaft rotates the rear wheel 2 in a high speed.

Because the second connection gear 31 connected to the second gearshift 27 has a diameter smaller by a half than that of the second gearshift, the third connection gear installed on a coaxial line has a diameter greater by a half than that of the second driving gear connected to the rear wheel shaft, thus the rear wheel shaft rotates two wheels when the third connection gear 31' rotates one wheel, and thus the rear wheel rotates in a high speed.

In this case, the first connection gear and the first driving gear connected to the first gearshift do not rotate, and only a shaft rotates.

Figure 12:
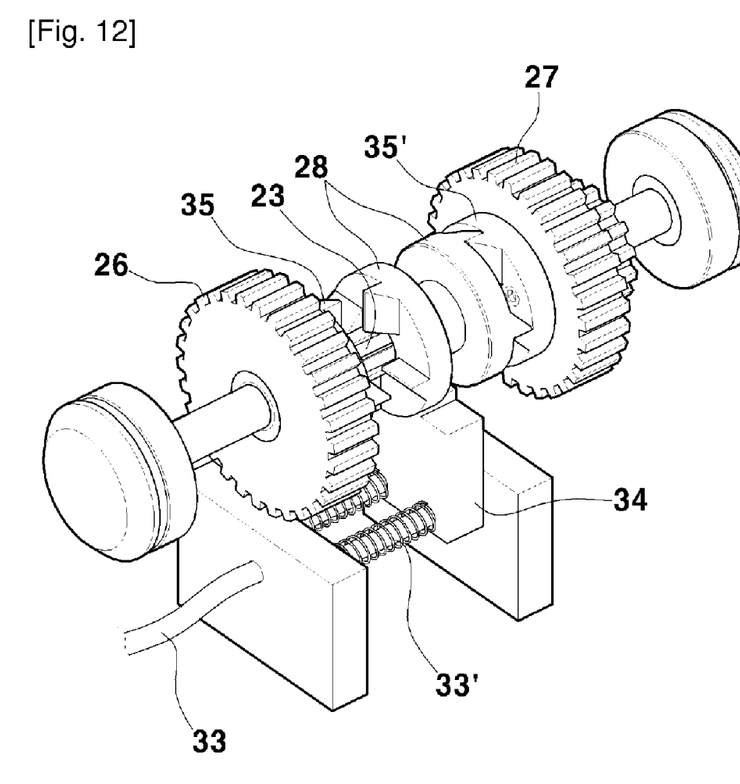
FIG. 12 is a perspective view illustrating a configuration of a clutch, a first gearshift, and a second gearshift installed in a driving controller of the mini bike according to an exemplary embodiment of the present invention.

FIG. 12 is a perspective view illustrating a clutch, a first gearshift, and a second gearshift installed in the driving controller of a mini bike according to an exemplary embodiment of the present invention.

A gearshift 34 is connected to the bottom of the clutch so that the clutch 28 installed in the driving controller B may be connected to the first gearshift 26 or the second gearshift 27, and according to whether operation of a clutch handle, a cable 33 pulls the gearshift and thus the clutch moves toward the first gearshift or the second gearshift 27 to control the driving of a low speed and a high speed.

In the mini bike according to an exemplary embodiment of the present invention, if the user puts both feet on the pedals and alternately stamps the pedals 11 and 11' or if the user stamps one pedal or simultaneously both pedals, the rear wheel is driven and thus the user can ride on the bike.

In the mini bike according to an exemplary embodiment of the present invention, when the user alternatively or simultaneously the stamps the pedal in order to travel the bike, muscular power of legs can be strengthened, the user can enjoy a speed by traveling the bike in a high speed or a lower speed using the clutch, and when traveling the bike in a hilly area, or if necessary, because the user can select a low speed, the user can safely ride on the bike.

Further, when manufacturing the bike, by installing a vertical rod having a saddle in an upper surface of a casing of the driving controller, the user can ride on the bike, like riding on a bicycle.

By detachably installing a normal saddle, a bike user can ride on the bike in a state where the saddle is installed or removed.

INDUSTRIAL APPLICABILITY

As described above, according to the present invention, as people of all ages and both sexes exercise using a bike regardless of a place, a bicycle can be used as a health instrument and a movement means for contributing to promoting health of people. Further, in a downtown area where many apartments and buildings exist, because a parkway is formed instead of a playground, by riding on a bike in a park, a people can obtain an exercise effect even in the downtown area.

The invention claimed is:

1. A mini bike having a pedal as a power generator that has a handle 3 in an upper part in order to steer a front wheel 1 and connects a front wheel 1 side and a rear wheel 2 to a bike body 9, and drives the wheels by operating a pedal connected to a plurality of gears, and adjusts a speed thereof using a brake handle 7 installed in the handle 3, comprising:

a driver A connecting a pedal shaft 12 between both pedals 11 and 11' and in which a spring 16 is installed at the inside of a connector of both sides of the pedal shaft to which both pedals 11 and 11' are connected, and in which one end of the pedal shaft 12 and a shaft 13 are connected to a first bevel gear 14 in order to transmit rotation power generated by a vertical rolling motion due to an elastic force of the spring 16;

a second bevel gear 22 installed to connect the other side end of the shaft 13 and a driver shaft 21 in order to transmit rotation power generated in the driver A;

a first power transmission gear 25 coaxially installed in on the drive shaft 21 and being engaged with a second transmission gear 24 in order to transmit rotation power to a spline shaft 23;

a clutch 28 that is positioned at the spline shaft 23 to selectively connect rotation power of the first power transmission gear 25 to a first gearshift 26 and a second gearshift 27 and controls a low speed and a high speed;

a first connection gear 29 and a first driving gear 30 engaged with the first gearshift 26 rotating by selection of the clutch 28 to rotate the rear wheel in a low speed;

a second connection gear 31 and a second driving gear 32 connected to a third connection gear engaged with the second gearshift 27 by selection of the clutch to be connected to rotate the rear wheel in a high speed; and a driving controller B comprising a gearshift 34 connected to a cable 33 in order to select the first gearshift 26 and the second gearshift 27 by laterally moving the clutch 28 on the spline shaft 23.

2. The mini bike of claim 1, wherein the first gearshift 26 and the second gearshift 27 have clutch cams 35 and 35', respectively on surfaces corresponding to each other to be connected to the clutch in order to transmit rotation power of the spline shaft.

3. The mini bike of claim 1, wherein the driver A and the driving controller B install a driver casing 15 and a driving controller casing 37 at the lower end of a bike body, and a reinforcement member 38 is installed at a corner of each casing.

* * * * *